(12) United States Patent
Lu et al.

(10) Patent No.: US 8,363,194 B2
(45) Date of Patent: Jan. 29, 2013

(54) LIQUID CRYSTAL DISPLAY PANEL

(75) Inventors: Wan-Hua Lu, Hsin-Chu (TW); Chia-Yu Lee, Hsin-Chu (TW); Pei-Chun Liao, Hsin-Chu (TW); Ting-Jui Chang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 13/459,267

(22) Filed: Apr. 30, 2012

(65) Prior Publication Data
US 2012/0212699 A1 Aug. 23, 2012

Related U.S. Application Data

(62) Division of application No. 12/471,414, filed on May 25, 2009, now Pat. No. 8,194,221.

(30) Foreign Application Priority Data

Dec. 18, 2008 (TW) ................................ 97149372 A

(51) Int. Cl.
G02F 1/1343 (2006.01)
(52) U.S. Cl. ........................ 349/143; 349/144; 349/146
(58) Field of Classification Search .................. None
See application file for complete search history.

(56) References Cited

U.S. PATENT DOCUMENTS

| 6,879,364 | B1 * | 4/2005 | Sasaki et al. ................. 349/129 |
| 8,054,434 | B2 * | 11/2011 | Jun et al. ........................ 349/141 |
| 2001/0004274 | A1 * | 6/2001 | Sakamoto et al. ............. 349/43 |
| 2001/0020992 | A1 * | 9/2001 | Takeda et al. ................. 349/130 |
| 2003/0071952 | A1 | 4/2003 | Yoshida |
| 2006/0066795 | A1 * | 3/2006 | Hsu et al. ....................... 349/136 |
| 2006/0087608 | A1 | 4/2006 | Lee |
| 2007/0216838 | A1 | 9/2007 | Hsu |
| 2007/0236637 | A1 | 10/2007 | Hsieh |
| 2007/0247559 | A1 * | 10/2007 | Tasaka et al. .................... 349/46 |
| 2008/0007681 | A1 | 1/2008 | Chen |
| 2008/0074600 | A1 | 3/2008 | Hsu et al. |
| 2008/0079883 | A1 * | 4/2008 | Yang et al. ..................... 349/142 |
| 2008/0259263 | A1 | 10/2008 | Cho |
| 2008/0278651 | A1 * | 11/2008 | Lee et al. ......................... 349/43 |
| 2009/0122246 | A1 * | 5/2009 | Hsu et al. ....................... 349/129 |
| 2010/0214517 | A1 * | 8/2010 | Um et al. ....................... 349/141 |
| 2011/0001894 | A1 | 1/2011 | Owaku |
| 2011/0157535 | A1 | 6/2011 | Chen |

FOREIGN PATENT DOCUMENTS

| JP | 2006276357 | | 10/2006 |
| JP | 2007-11037 A | * | 1/2007 |
| TW | 200734731 | | 9/2007 |

* cited by examiner

Primary Examiner — Mike Stahl
(74) Attorney, Agent, or Firm — Winston Hsu; Scott Margo

(57) ABSTRACT

In a liquid crystal display panel, a pixel electrode includes at least a main electrode strip and a plurality of sub electrode branches. The sub electrode branches extend outwardly from two opposite edges of the main electrode strip. The main electrode strip includes at least a node-controlling portion, the controlling width of the node-controlling portion are different from a trunk width of the main electrode strip. Otherwise, a plurality of first sub electrode branches and a plurality of second sub electrode branches are extend outwardly from two opposite edges of the main electrode strip respectively. Relating to the position of the first sub electrode branches, the second sub electrode branches has a position-shift amount along the extending direction of the main electrode strip. The position-shift amount is smaller than the branch width of the first or second sub electrode branch.

22 Claims, 8 Drawing Sheets

LIQUID CRYSTAL DISPLAY PANEL

CROSS REFERENCE TO RELATED APPLICATIONS

This is a divisional application of patent application Ser. No. 12/471,414 filed on May 25, 2009, now allowed. The prior application Ser. No. 12/471,414 claims the benefit of Taiwan Patent Application No. 097149372 filed on Dec. 18, 2008, the disclosures of which are incorporated herein by reference in their entirety.

BACKGROUND OF THE INVENTION

1. Field of the Invention

The present invention relates to a liquid crystal display panel, and more particularly, to a fine-slit stabilized multi-domain vertical alignment (FSMVA) liquid crystal display panel.

2. Description of the Prior Art

With the prevalence of large-scale liquid crystal display (LCD) panels, the LCD panels should have a wide view angle characteristic so as to satisfy the needs of viewers. Therefore, the LCD panel having a wide view angle characteristic such as a multi-domain vertical alignment (MVA) has become one mainstream of the large-scale flat LCD panels now.

Conventionally, an array substrate of an MVA LCD panel has a patterned pixel electrode, and a color filter substrate (CF substrate) usually includes a plurality of protrusions disposed corresponding to the centre of the pixel electrode. The liquid crystal molecules can slightly tilt by virtue of the fringe field effect of the pixel electrode and the geometrical shape of the protrusion. However, when a voltage is applied to the pixel, the negative type liquid crystal molecules can tilt. Concurrently, different displaying domains can be formed according to different tilt directions of the liquid crystal molecules so as to acquire a wide view angle characteristic. Consequently, a conventional MVA display panel can provide a wider view angle. However, since parts of liquid crystal molecules slightly tilt due to the alignment protrusion when there is no voltage applied to the pixels, the LCD panel may have light leakage problem and therefore the contrast ratio of the LCD panel is decreased. Accordingly, the displaying effect of the LCD may be influenced.

Therefore, an improved FSMVA LCD panel is gradually developed. With reference to FIG. 1, FIG. 1 is schematic diagram illustrating a part of sub pixel regions of a conventional FSMVA LCD panel. As illustrated in FIG. 1, the pixel electrode 20 of the conventional FSMVA LCD panel consists essentially of the main electrode strip 22 and the sub electrode branches 24. The main electrode strip 22 is a conductive material formed in a shape of a completed rectangle, which is long and narrow. The sub electrode branches 24 extend outwardly from the opposite edges of the main electrode strip 22 and are completely symmetrical to the main electrode strip 22. As far as the liquid crystal molecules 30 are concerned, the main electrode strip 22 are formed as a trunk of the pixel electrode 20, and spaces formed between the adjacent sub electrode branches 24 disposed on the same edge are a plurality of fine slits 26.

Accordingly, it is the fine slits 26 of the conventional FSMVA LCD panel that tilt the liquid crystal molecules toward different directions to form different displaying domains. For the conventional FSMVA LCD panel, the additional protrusions are no longer needed on the array substrate or the color filter substrate, and the slits are no longer needed on the color filter substrate. Although the liquid crystal molecules 30 corresponding to the fine slits 26 can tilt toward a specific direction, however, the liquid crystal molecules 30 corresponding to the main electrode strip 22 may tilt toward random directions. Accordingly, a lot of nodes randomly appear on the trunk of the pixel. When images are displayed, the aforementioned nodes easily lead to the image retention (IR) problem and therefore influence the display quality.

Therefore, how to provide a nice VAM LCD panel, which helps the liquid crystal molecules stably arranged and avoids the residual images, is still a main object to conquer now.

SUMMARY OF THE INVENTION

One object of the present invention is to provide an LCD panel to solve the aforementioned problem.

To achieve the above-mentioned purpose, the embodiment of the present invention provides an LCD panel. The LCD panel includes a first substrate having a common electrode, a second substrate having a pixel electrode, and a liquid crystal layer disposed between the first substrate and the second substrate. The pixel electrode includes at least a main electrode strip and a plurality of sub electrode branches. The sub electrode branches extend outwardly from the opposite edges of the main electrode strip and are completely symmetrical to the main electrode strip. The main electrode strip has a trunk width, and the main electrode strip has at least a node-controlling portion. However, the controlling width of the node-controlling portion is different from the trunk width of the main electrode strip.

To achieve the above-mentioned purpose, the embodiment of the present invention further provides an LCD panel. The LCD panel includes a first substrate having a common electrode, a second substrate having a pixel electrode, and a liquid crystal layer disposed between the first substrate and the second substrate. The pixel electrode includes at least a main electrode strip, a plurality of first sub electrode branches and a plurality of second sub electrode branches. The main electrode strip extends along the first direction, and the main electrode strip has a first edge and a second edge opposite to the first edge. The first sub electrode branch extends outwardly from the first edge of the main electrode strip, and the second sub electrode branch extends outwardly from the second edge of the main electrode strip. Each of the first sub electrode branches and each of the second electrode branches respectively have a branch width. The positions of the second sub electrode branches are apart for a position-shift amount along the first direction from the first sub electrode branches. However, the position-shift amount P is larger than 0 but smaller than the branch width of each of the first and second electrode branches.

The detailed description and attaching diagrams related to the present invention are illustrated as follows. However, the attaching diagrams are only provided for reference and for auxiliary explanation but not limited thereto.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the presented invention, preferred embodiments will be detailed as follows. The preferred embodiments of the present invention are illustrated in the accompanying drawings with numbered elements to elaborate the contents and effects to be achieved.

Figure 1:
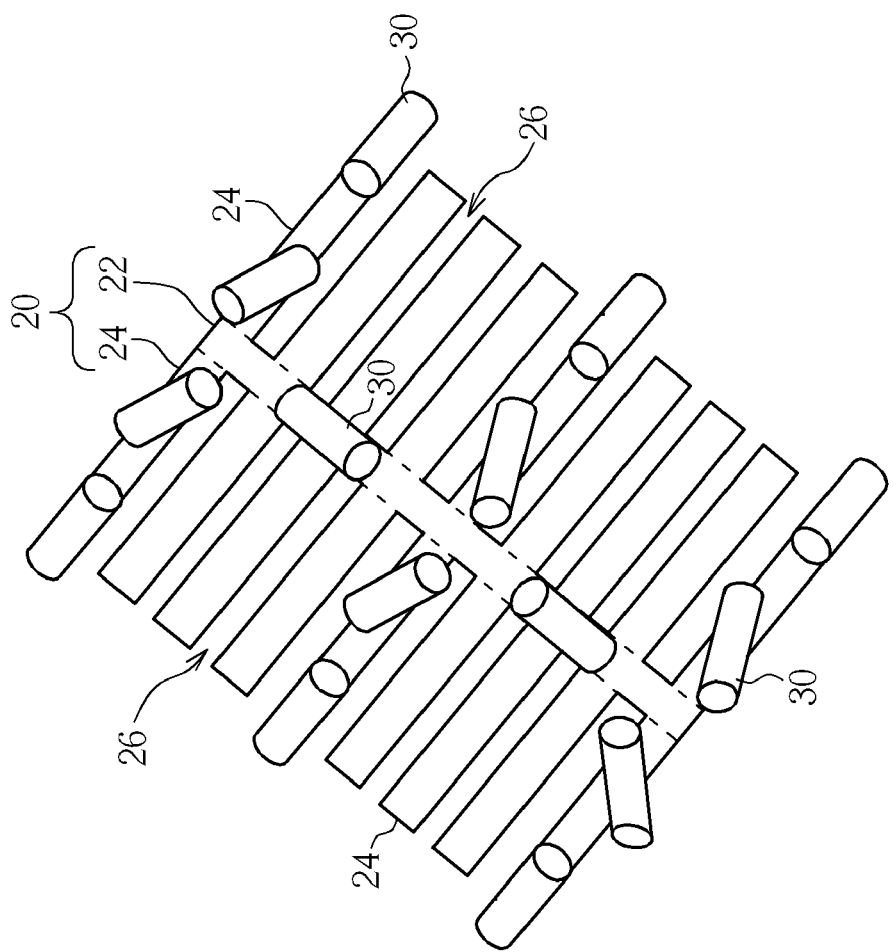
FIG. 1 is schematic diagram illustrating a part of sub pixel regions of a conventional FSMVA LCD panel.
Figure 2:
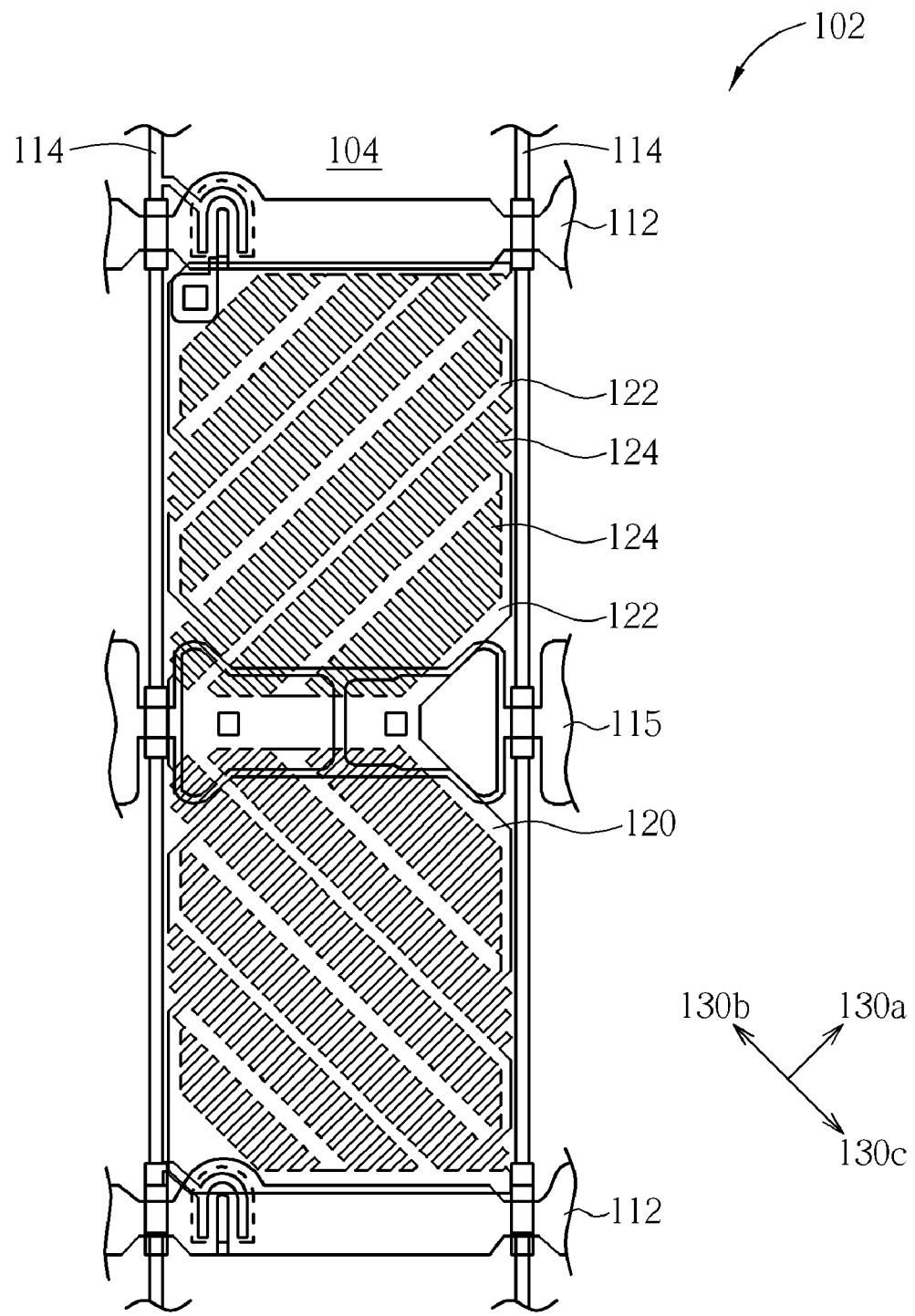
FIG. 2 to FIG. 4 are schematic diagrams illustrating a preferred embodiment of the sub pixel structure of the LCD panel of the present invention.
Figure 3:
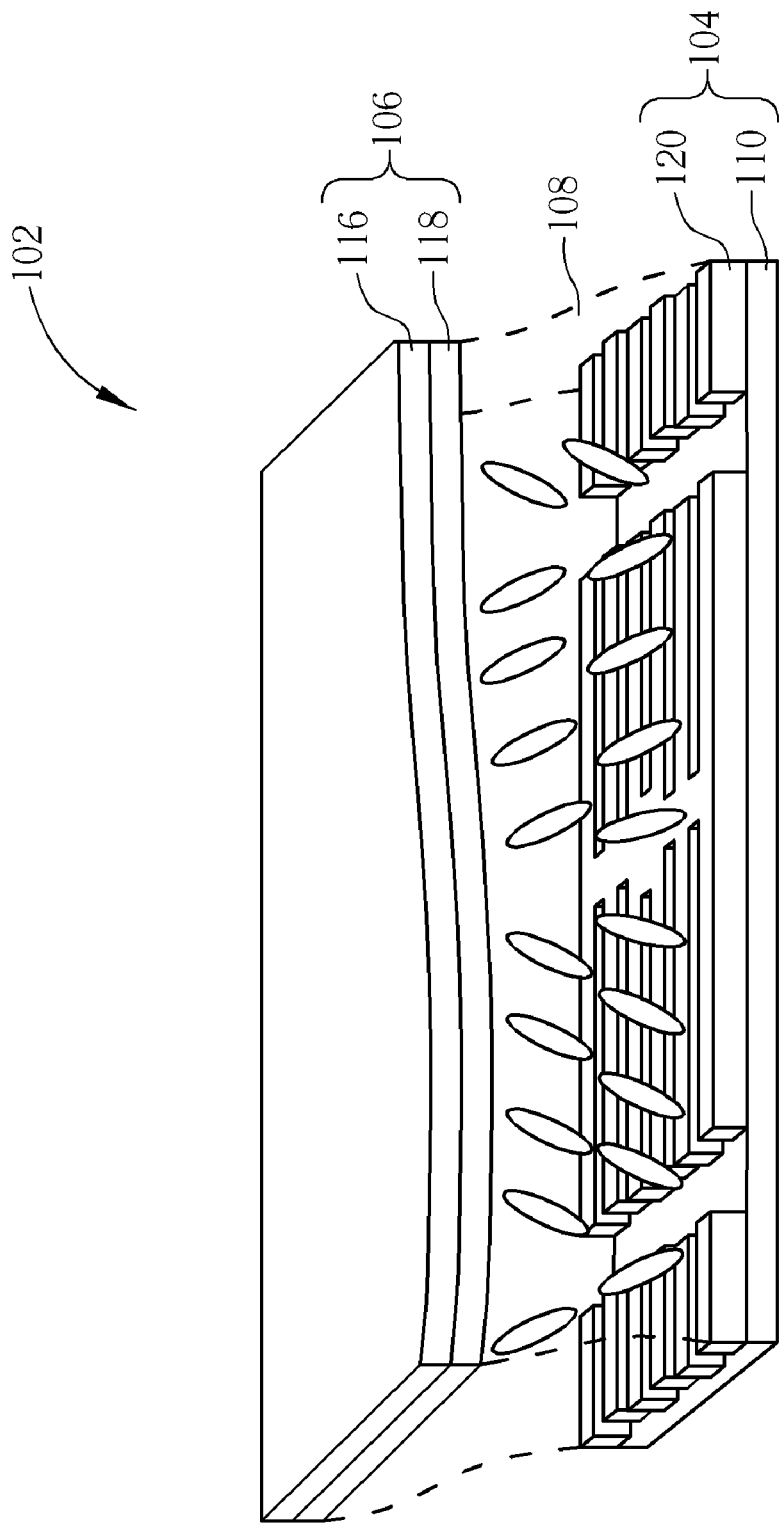
Figure 4:
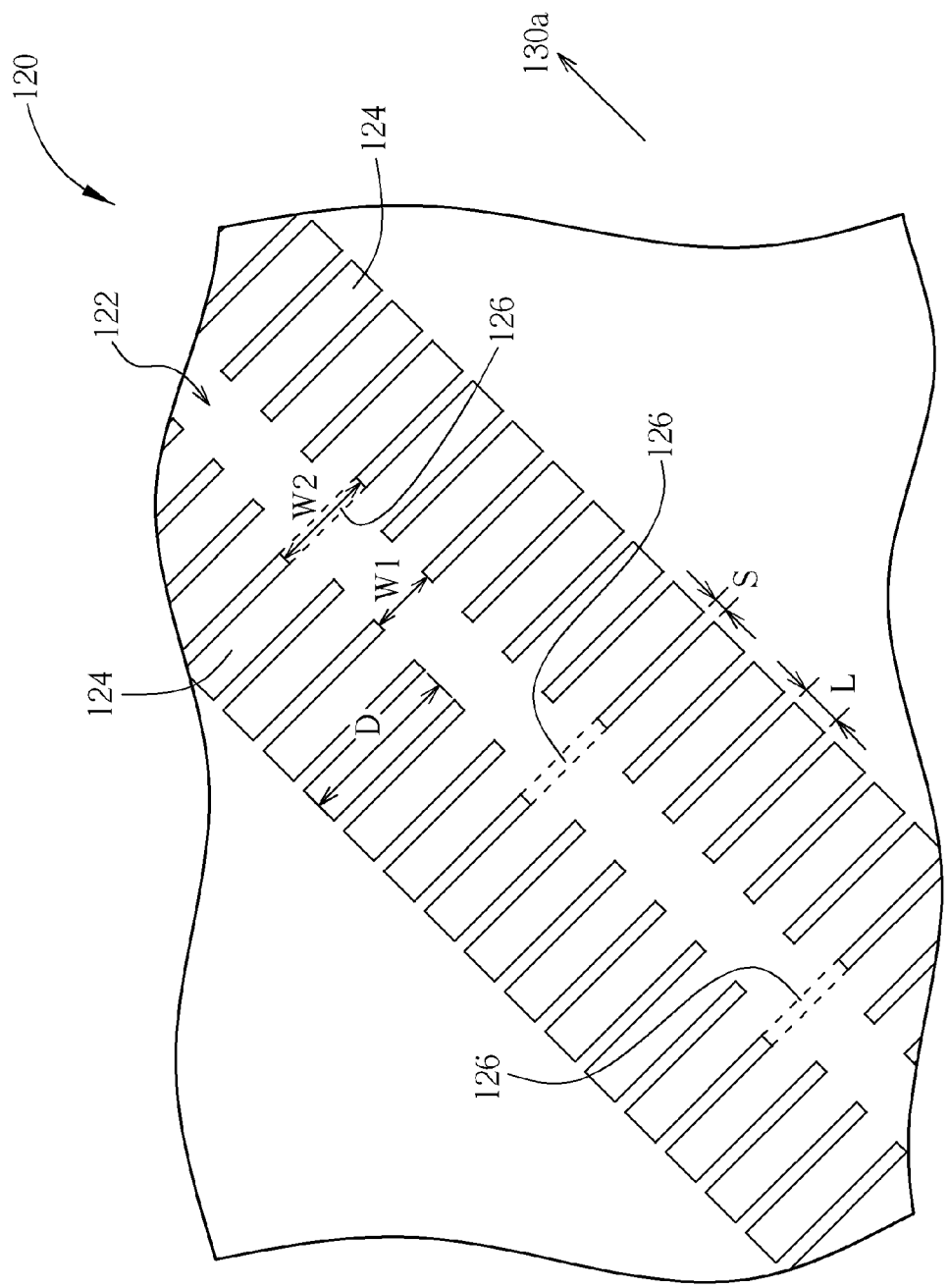

With reference to FIG. 2 to FIG. 4, FIG. 2 to FIG. 4 are schematic diagrams illustrating a preferred embodiment of the sub pixel structure of the LCD panel of the present invention. For example, the said sub pixel structure of this embodiment can be any one of the red, green and blue sub pixel structures. FIG. 2 is a top view of the sub pixel structure, FIG. 3 is an oblique view of the sub pixel structure, and FIG. 4 is an enlarged view of a part of the pixel electrode. In order to put emphasis on the characteristics of the present invention, only one sub pixel structure is illustrated in FIG. 2 and FIG. 3, and only a main electrode strip is illustrated in FIG. 4. However, several main electrode strips can be designed as required. A part of components of the LCD panel are not illustrated in FIG. 2 to FIG. 4, and the LCD panel actually may include a plurality of sub pixel structures. Moreover, the pixel electrode illustrated in FIG. 2 is only drawn in a skeleton form, and some detailed patterns of the pixel electrode are omitted. However, the detailed pattern may be referred in the enlarged view of FIG. 4. Besides, the LCD panel of this embodiment can be a FSMVA LCD panel but not limited thereto.

As illustrated in FIG. 2 and FIG. 3, the sub pixel structure 102 of the LCD panel of this embodiment includes a first transparent substrate 104, such as a thin film transistor substrate, a second transparent substrate 106, such as a color filter substrate, and a liquid crystal layer 108. The first transparent substrate 104 is disposed opposite and corresponding to the second transparent substrate 106. The liquid crystal layer 108 is disposed between the first transparent substrate 104 and the second transparent substrate 106, and the liquid crystal layer 108 includes liquid crystal molecules. The first transparent substrate 104 can include a glass substrate 110 and a plurality of pixel electrodes 120. As illustrated in FIG. 2, the first transparent substrate 104 can further include a plurality of scan lines 112 parallel to each other and a plurality of data lines parallel to each other. A plurality of sub pixel structures 102 may be substantially defined on the first transparent substrate 104 by the scan lines 112 and the data lines. Each of the sub pixel structures 102 further includes a plurality of storage capacitor bus lines 115 parallel to the scan lines 112, and the storage capacitor bus lines 115 may cross the sub pixel structure 102. The first transparent substrate 104 may further include an alignment film and a polarizing sheet (not shown in the figures). For instance, the polarizing sheet can be circularly polarizer or linear polarizer but not limited thereto.

As comparing FIG. 2 and FIG. 3, the second transparent substrate 106 includes a glass substrate 116 and a common electrode 118, and the second transparent substrate 106 may further include components, such as a black matrix pattern, a color filter, an alignment film and a polarizing sheet (not shown in the figure). The black matrix pattern can be disposed roughly corresponding to the scan lines 112 and data lines 114 of the first transparent substrate 104. The color filter can be disposed roughly corresponding to the pixel electrode 120, and the common electrode 118 can cover both the surfaces of the black matrix pattern and the color filter.

The glass substrate 110 and the glass substrate 116 can be replaced by other substrates made of other transparent materials such as quartz or plastics. Both the pixel electrode 120 and common electrode 118 can be transparent conductive layer such as indium tin oxide (ITO) transparent electrode. If the LCD panel is a reflective LCD or a transflective LCD, the pixel electrode 120 can also include a light-reflecting electrode.

In each of the pixel structure 102, the pixel electrode 120 includes at least a main electrode strip 122 and a plurality of sub electrode branches 124. The sub electrode branches 124 extend outwardly from the opposite edges of the main electrode strip 122, and may be completely symmetrical to the main electrode strip 122. For example, the sub pixel structure 102 illustrated in FIG. 2 includes a plurality of main electrode strips 122 and sub electrode branches 124, a part of the main electrode strips 122 can extend along the first direction 130a, and a part of the main electrode strips 122 can extend along the second direction 130b so that the liquid crystal molecules of the liquid crystal layer 108 are divided into multiple domains. The first direction 130a and the second direction 130b illustrated in FIG. 2 are substantially orthogonal to each other. However, the included angle of the first direction 130a and the second direction 130b is not limited to 90 degree and can be any proper angle. Besides, each of the sub electrode branches 124 illustrated in FIG. 2 can be vertical to the main electrode strip 122 and extend outwardly from the main electrode strip 122, but not limited thereto. As far as the main electrode strip 122 along the first direction 130a is concerned, each of the sub electrode branches 124 connected to the aforementioned main electrode strip 122 substantially extends along the third direction 130c, and the third direction 130c is vertical to the first direction 130a. In other embodiments, the included angle of the third direction 130c and the first direction 130a of the sub electrode branches 124 can be an obtuse angle or an acute angle. In other embodiment, the sub electrode branches 124 connected to the main electrode strip 122 can also extend along different directions. For example, the sub electrode branches 124 may extend radially.

As illustrated in FIG. 4, the main electrode strip 122 has a trunk width W1, and the main electrode strip 122 includes at least a node-controlling portion 126 disposed between two adjacent sub electrode branches 124. The controlling width W2 of the node-controlling portion 126 is different from the trunk width W1 of the main electrode strip 122. In this embodiment, the controlling width W2 of the node-controlling portion 126 is larger than the trunk width W1 of the main electrode strip 122. For example, the ratio of the controlling width W2 of the node-controlling portion 126 to the trunk width W1 of the main electrode trunk 122 is preferably larger than 1 and smaller than 3, so as to obtain a satisfactory node-controlling effect but not limited thereto. The node-controlling portion 126 is preferable in an arrangement symmetrical to the central axis of the main electrode strip 122 so as to form a symmetrical pattern. In other embodiments, the node-controlling portion 126 may not symmetrical to the central axis of the main electrode strip 122. For example, the position of the node-controlling portion 126 has a left shift or a right shift from to the central axis of the main electrode strip 122.

The node controlling portion 126 is mainly disposed within the trunk and makes the liquid crystal molecules tilt inward or outward. Afterwards, most of the liquid crystal optical nodes only appear on the node-controlling portion 126 of the present invention. Therefore, the occurrence of the irregularly random nodes can be decreased. In the layout of this embodiment, a single main electrode strip 122 can have a plurality of node-controlling portions 126, and two to fifteen of sub electrode branches 124 are disposed between any two adjacent node-controlling portions 126 at one edge of the main electrode strip 122. The two adjacent sub electrode branches apart from each other on the same edge has an interval S, and the size of the branch width L of each of the sub electrode branches 124 is preferable about one time to three times of the interval S. The length D of each of the sub electrode branches 124 is preferable about three to six times of the trunk width W1 of the main electrode strip 122. The quantity and size of the sub electrode branches 124 should not be limited thereto, and may be any proper quantity or size that enable LCD panel to include no additional protrusions on the inner side of the CF substrate. The sub electrode branches 124 can have different lengths from each other or have the same length. The aforementioned trunk width W1, the controlling width W2, the number of the sub electrode branches 124 between any two adjacent node-controlling portions 126, the interval S between any two adjacent sub electrode branches 124, the branch width L of each of the sub electrode branches 124 and the layout relationship therebetween can be moderately adjusted according to the various factors of the size, type and functional design of the display.

When no voltage is applied to the pixel electrode 120, the liquid crystal molecules of the liquid crystal layer 108 disposed on the pixel electrode 120 can be arranged perpendicular to the substrate (not shown in the figure). As illustrated in FIG. 3, when a voltage is applied to the pixel electrode 120, the liquid crystal molecules of the liquid crystal layer 108 disposed on the pixel electrode 120 can be induced and tilt due to the electric field. Since the fringe field effect may be caused by the pattern of the pixel electrodes 120, the liquid crystal molecules disposed on the two opposite edges of the main electrode strip 122 can have different tilt directions so as to form multi-domain in the sub pixel structure 102. Besides, since the present invention has the significant node-controlling portions 126, the node-controlling portion 126 can accordingly assist to control the tilt directions of the liquid crystal molecules disposed around the node-controlling portion 126. As a result, most of the optical nodes disposed on the trunk appear only on the node-controlling portion 126, and the image retention (IR) problem of the LCD panel may be therefore decreased. Thus, the present invention can directly utilize the pixel electrode 120 to efficiently control the tilt directions of the liquid crystal molecules, and has no need to dispose additional alignment protrusions inside the second transparent substrate 106. Accordingly, the light leakage problem generated in the LCD panel in the dark state is decreased, and the contrast of the LCD panel is increased.

Figure 5:
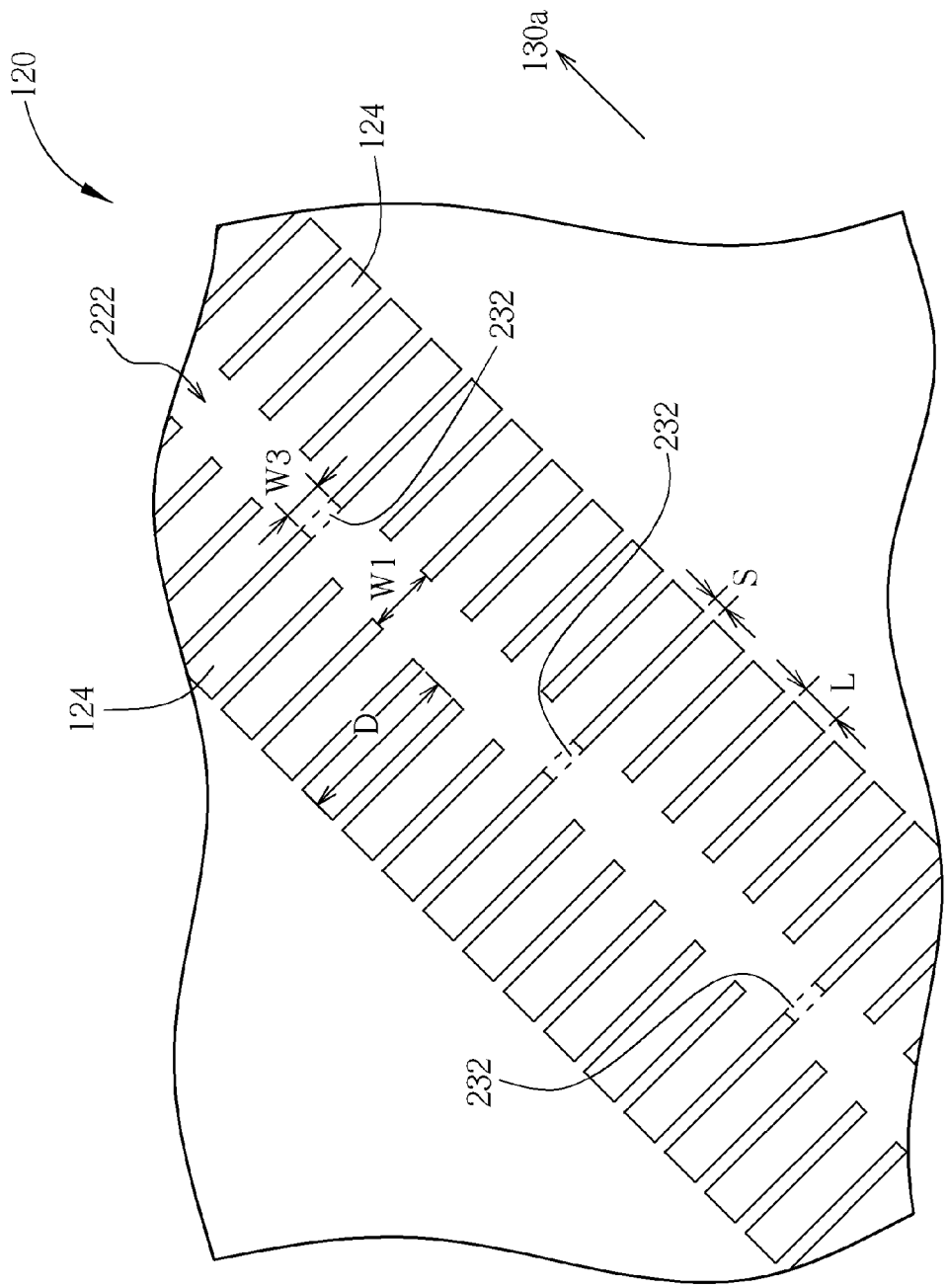
FIG. 5 to FIG. 7 are enlarged schematic diagrams illustrating other preferred embodiments of the pixel electrode of the present invention.
Figure 6:
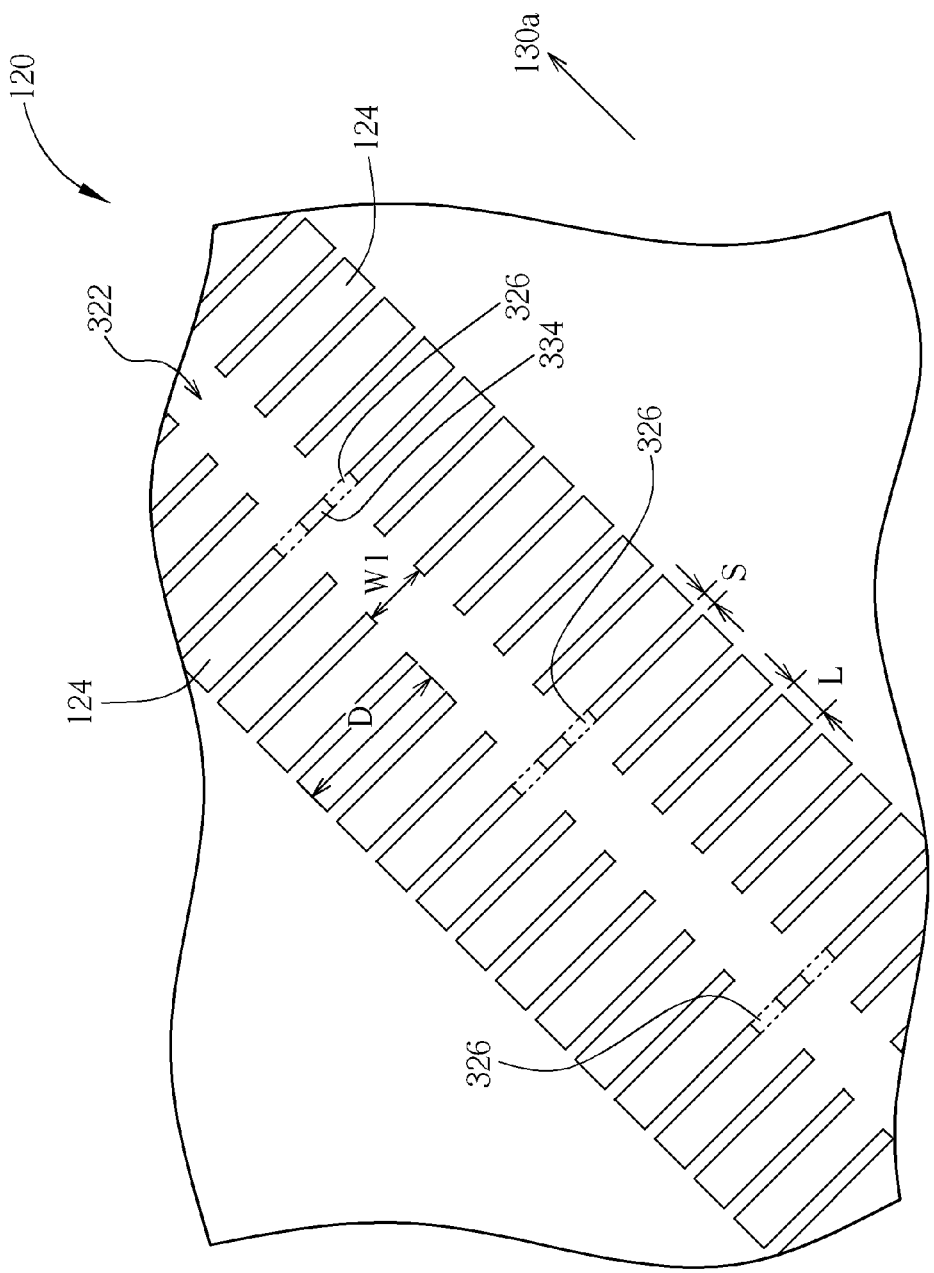
Figure 7:
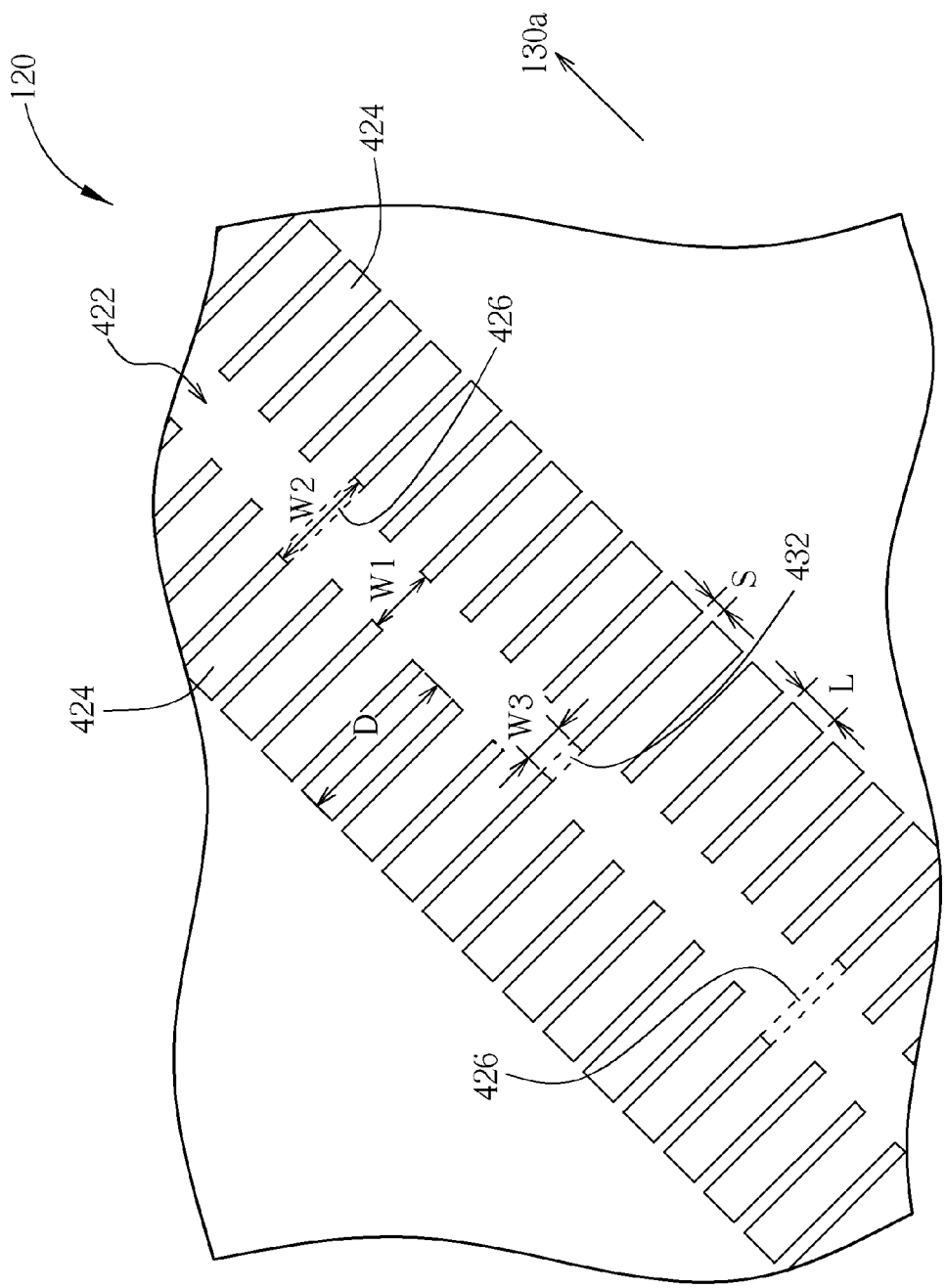

In the above-mentioned embodiment, the controlling width W2 of the node controlling portion 126 is larger than the trunk width W1 of the main electrode strip 122 to induce the liquid crystal molecules. In other embodiments, the pixel electrode of the present invention can also have other layout designs. With reference to FIG. 5 to FIG. 7, FIG. 5 to FIG. 7 are enlarged schematic diagrams illustrating other preferred embodiments of the pixel electrode of the present invention. Similarly, each of the sub pixel structures of the LCD panels partially illustrated in FIG. 5 to FIG. 7 can include a first transparent substrate, a second transparent substrate and a liquid crystal layer, and the similar characteristics are no more detailed here. As illustrated in FIG. 5, the major difference between the embodiment illustrated in FIG. 5 and the embodiment illustrated in FIG. 4 is in that the controlling width W3 of the node-controlling portion 232 is smaller than the trunk width W1 of the main electrode strip 222 in this embodiment. For example, if the ratio of the controlling width W3 of the node-controlling portion 232 to the trunk width W1 of the main electrode strip 222 is larger than 0.3 and smaller than 1, a good node-controlling effect can be achieved, but not limited thereto.

As illustrated in FIG. 6, the major difference between the embodiment illustrated in FIG. 6 and the embodiment illustrated in FIG. 4 is in that each of the node-controlling portions 326 of this embodiment disposed on the central region further includes an opening 334. The positions, shapes and sizes of the openings 334 are not limited by FIG. 6. In the present invention, the openings 334 of the main electrode strip 322 have no need to be disposed on the centre of the node-controlling portion 326, can be disposed asymmetric to the central axis of the main electrode strip 122, and near one edge of the node-controlling portion 326 as required. The shapes of the opening 334 can include rectangle opening, square opening, other regular polygon opening or even other irregular openings, but not limited thereto.

As illustrated in FIG. 7, the major difference between this embodiment illustrated in FIG. 7 and the embodiment illustrated in FIG. 4 is in that this embodiment has a first node-controlling portion 426, which is wider than the main electrode strip 422 and a second node-controlling portion 432, which is narrower than the main electrode strip 422. The main electrode strip 422 of this embodiment has a plurality of first node-controlling portions 426 and a plurality of second node-controlling portions 432 disposed between the sub electrode branches 424 individually. The controlling width W2 of the first node-controlling portion 426 can be larger than the trunk width W1 of the main electrode strip 422, and the controlling width W3 of the second node-controlling portion 432 can be smaller than the trunk width W1 of the main electrode strip 422. The first node-controlling portions 426 and the second node-controlling portions 432 can be arranged alternately. Two to fifteen of the sub electrode branches 424 may be disposed between one of the first node-controlling portions 426 and the adjacent second node-controlling portion 426 at one edge of the main electrode strip 422, but not limited.

Figure 8:
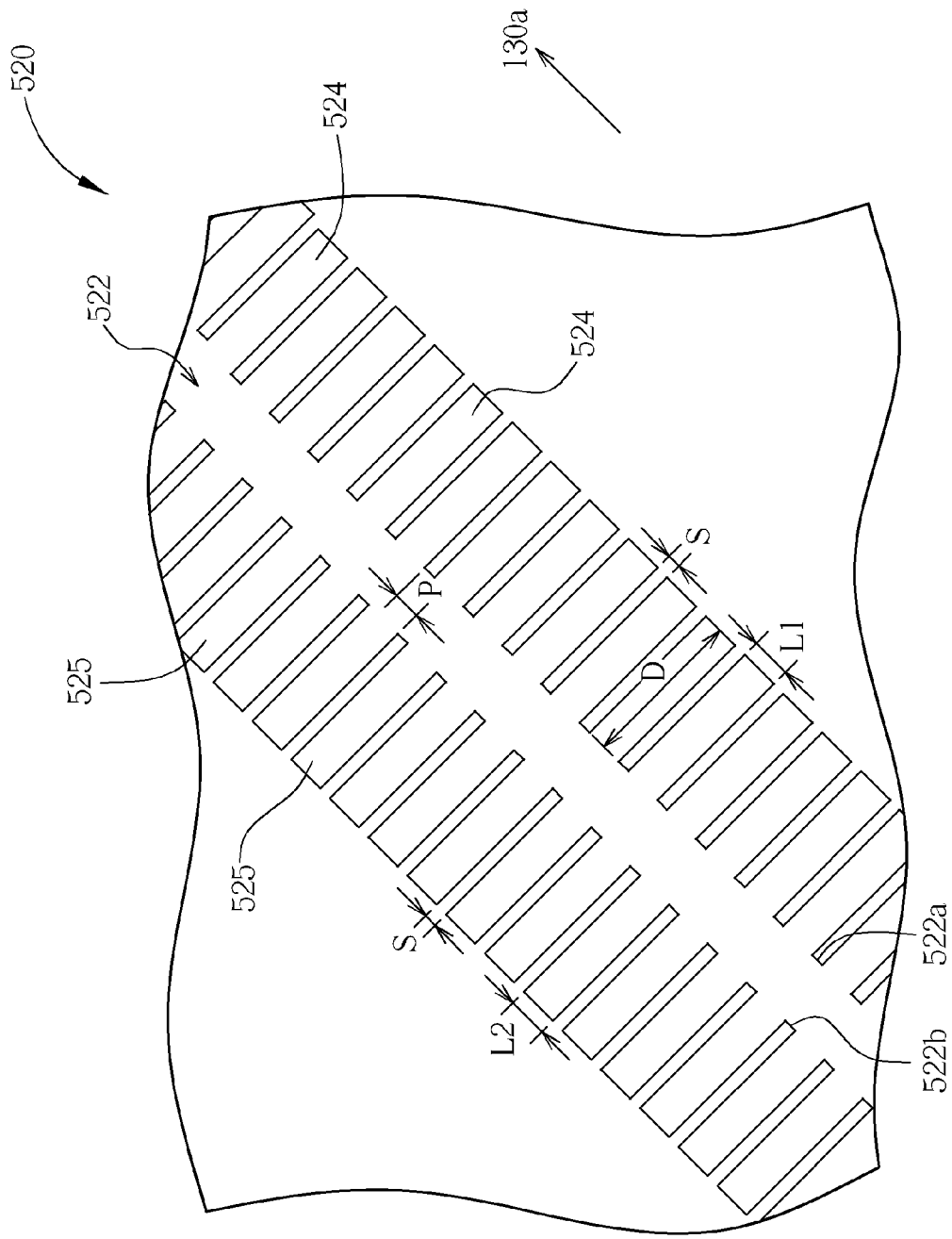
FIG. 8 is an enlarged schematic diagram illustrating another preferred embodiment of the pixel electrode of the present invention.

Besides, the pixel electrode of the present invention can utilize the arrangement of the sub electrode branches to avoid the image retention (IR) problem. With reference to FIG. 8, FIG. 8 is an enlarged schematic diagram illustrating another preferred embodiment of the pixel electrode of the present invention. Similarly, the sub pixel structure of the LCD panel of this embodiment partially illustrated in FIG. 8 can include a first transparent substrate, a second transparent substrate and a liquid crystal layer. However, the similar characteristics are no more detailed here. As illustrated in FIG. 8, the pixel electrode 520 can include at least a main electrode strip 522, a plurality of the first sub electrode branches 524 and a plurality of the second sub electrode branches 525 in the LCD panel of this embodiment. The main electrode strip 522 extends along the first direction 130a, and the main electrode strip 522 has a first edge 522a and a second edge 522b opposite to the first edge 522a. The first sub electrode branches 524 can extend outwardly from the first edges 522a of the main electrode strip 522, and the second sub electrode branches 525 can extend outwardly from the second edges 522b of the main electrode strip 522. Each of the first sub electrode branches 524 and each of the second sub electrode branches 525 have a branch width L1 and a branch width L2 respectively. The positions of the second sub electrode branches 525 are apart for a position-shift amount P along the first direction 130a from the first sub electrode branches 524. The position-shift amount P is larger than 0 and smaller than the branch width L1 or the branch width L2. According to test results, the aforementioned position-shift amount P is preferable about 20 percent (20%) to 80 percent (80%) of the branch width L1 or the branch width L2, and more preferable about 50 percent (50%) of the branch width L1 or L2.

The branch width L1 of the first sub electrode branch 524 is preferably about one time to three times of the interval S between two adjacent first sub electrode branches 524, and the branch width L2 of the second sub electrode branch 525 is preferable about one time or three times of the width of the interval S between two adjacent second sub electrode branches 525. The length D of each of the first and second sub pixel branches 524, 525 is preferably about three to six times of the trunk width W1 of the main electrode strip 522, but not limited thereto.

Since the positions of the second sub electrode branches 525 are apart for a position-shift amount P along the first direction 130a from the first sub electrode branches 524, the second sub electrode branch 525 is not aligned in a straight line to the opposite first sub electrode branch 524, and may still overlap the first sub electrode branch 524. According to the simulation result of the present invention, the layout pattern, in which the second sub electrode branches 525 are apart from the first sub electrode branches 524 for a position-shift amount P along the first direction 130a, can efficiently eliminate the image retention (IR) and even dismiss the optical nodes. Accordingly, the liquid crystal molecules corresponding to the trunk are arranged toward the same direction.

In summary, since the pixel electrode of the present invention has significant node-controlling portions or the positions of the second sub electrode branches 525 are apart for a position-shift amount P along the first direction 130a from the first sub electrode branches 524, the present invention can directly utilize the pixel electrode to efficiently control the tilt directions of the liquid crystal molecules so as to reduce the image retention (IR). Therefore, the additional alignment protrusions disposed inside the second transparent substrate are no longer needful for tilting the liquid crystal molecules. Consequently, the light leakage problem of the LCD panel operated in the dark state can be avoided, and the contrast of the LCD may be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display (LCD) panel, comprising:
   a first substrate comprising a common electrode;
   a second substrate comprising at least a pixel electrode, the pixel electrode comprising:
     at least a main electrode strip, extending along a first direction, the main electrode strip having a trunk width and at least a node-controlling portion, a controlling width of the node-controlling portion being different from the trunk width of the main electrode strip, wherein a ratio of the controlling width of the node-controlling portion to the trunk width of the main electrode strip is larger than 1 and smaller than or equal to 3; and
     a plurality of sub electrode branches, extending along a second direction different from the first direction, the sub electrode branches being extending outwardly from two opposite edges of the main electrode strip and being symmetrical to the main electrode strip; and
   a liquid crystal layer disposed between the first substrate and the second substrate.

2. The LCD panel of claim 1, wherein the node-controlling portion is disposed between the two adjacent sub electrode branches.

3. The LCD panel of claim 1, wherein the node-controlling portion further comprises an opening disposed on a centre of the node-controlling portion.

4. The LCD panel of claim 1, wherein the main electrode strip comprises a plurality of node-controlling portions disposed between the sub electrode branches, and two to fifteen of the sub electrode branches are disposed between the two adjacent node-controlling portions.

5. The LCD panel of claim 1, wherein the two adjacent sub electrode branches are apart from each other for an interval, and a branch width of each of the sub electrode branches is substantially one to three times of the interval.

6. The LCD panel of claim 1, wherein a length of each of the sub electrode branches is substantially three to six times of the trunk width of the main electrode strip.

7. The LCD panel of claim 1, wherein the second direction is substantially perpendicular to the first direction.

8. A liquid crystal display (LCD) panel, comprising:
   a first substrate comprising a common electrode;
   a second substrate comprising at least a pixel electrode, the pixel electrode comprising:
     at least a main electrode strip, extending along a first direction, the main electrode strip having a trunk width and at least a node-controlling portion, a controlling width of the node-controlling portion being different from the trunk width of the main electrode strip; and
     a plurality of sub electrode branches, extending along a second direction different from the first direction, the sub electrode branches being extending outwardly from two opposite edges of the main electrode strip and being symmetrical to the main electrode strip, wherein the main electrode strip comprises a plurality of first node-controlling portions and a plurality of second node-controlling portions disposed between the sub electrode branches individually, the controlling width of the first node-controlling portion is larger than the trunk width of the main electrode strip, and the controlling width of the second node-controlling portion is smaller than the trunk width of the main electrode strip; and
   a liquid crystal layer disposed between the first substrate and the second substrate.

9. The LCD panel of claim 8, wherein the first and second node-controlling portions are disposed alternately, and two to fifteen of the sub electrode branches are disposed between one of the first node-controlling portion and the adjacent second node-controlling portion.

10. The LCD panel of claim 8, wherein the two adjacent sub electrode branches are apart from each other for an interval, and a branch width of each of the sub electrode branches is substantially one to three times of the interval.

11. The LCD panel of claim 8, wherein a length of each of the sub electrode branches is substantially three to six times of the trunk width of the main electrode strip.

12. The LCD panel of claim 8, wherein the second direction is substantially perpendicular to the first direction.

13. A liquid crystal display (LCD) panel, comprising:
    a first substrate comprising a common electrode;
    a second substrate comprising at least a pixel electrode, the pixel electrode comprising:
      at least a main electrode strip, extending along a first direction, the main electrode strip having a trunk width and at least a node-controlling portion, a controlling width of the node-controlling portion being different from the trunk width of the main electrode strip; and a plurality of sub electrode branches, extending along a second direction different from the first direction, the sub electrode branches being extending outwardly from two opposite edges of the main electrode strip and being symmetrical to the main electrode strip, wherein a length of each of the sub electrode branches is substantially three to six times of the trunk width of the main electrode strip; and a liquid crystal layer disposed between the first substrate and the second substrate.

14. The LCD panel of claim 13, wherein the node-controlling portion is disposed between the two adjacent sub electrode branches.

15. The LCD panel of claim 13, wherein a ratio of the controlling width of the node-controlling portion to the trunk width of the main electrode strip is larger than 1 and smaller than or equal to 3.

16. The LCD panel of claim 15, wherein the node-controlling portion further comprises an opening disposed on a centre of the node-controlling portion.

17. The LCD panel of claim 13, wherein a ratio of the controlling width of the node-controlling portion to the trunk width of the main electrode strip is larger than or equal to 0.3 and smaller than 1.

18. The LCD panel of claim 13, wherein the main electrode strip comprises a plurality of node-controlling portions disposed between the sub electrode branches, and two to fifteen of the sub electrode branches are disposed between the two adjacent node-controlling portions.

19. The LCD panel of claim 13, wherein the main electrode strip comprises a plurality of first node-controlling portions and a plurality of second node-controlling portions disposed between the sub electrode branches individually, the controlling width of the first node-controlling portion is larger than the trunk width of the main electrode strip, and the controlling width of the second node-controlling portion is smaller than the trunk width of the main electrode strip.

20. The LCD panel of claim 19, wherein the first and second node-controlling portions are disposed alternately, and two to fifteen of the sub electrode branches are disposed between one of the first node-controlling portion and the adjacent second node-controlling portion.

21. The LCD panel of claim 13, wherein the two adjacent sub electrode branches are apart from each other for an interval, and a branch width of each of the sub electrode branches is substantially one to three times of the interval.

22. The LCD panel of claim 13, wherein the second direction is substantially perpendicular to the first direction.

* * * * *